G. T. ELLIS.
Road-Engine.

No. 161,217.

4 Sheets--Sheet 2.

Patented March 23, 1875.

WITNESSES
Grenville Lewis
M. Church

INVENTOR
George T. Ellis
By Hill Ellsworth
ATTORNEYS

THE GRAPHIC CO. PHOTO-LITH. 39 & 41 PARK PLACE, N.Y.

4 Sheets--Sheet 3.
G. T. ELLIS.
Road-Engine.
No. 161,217. Patented March 23, 1875.
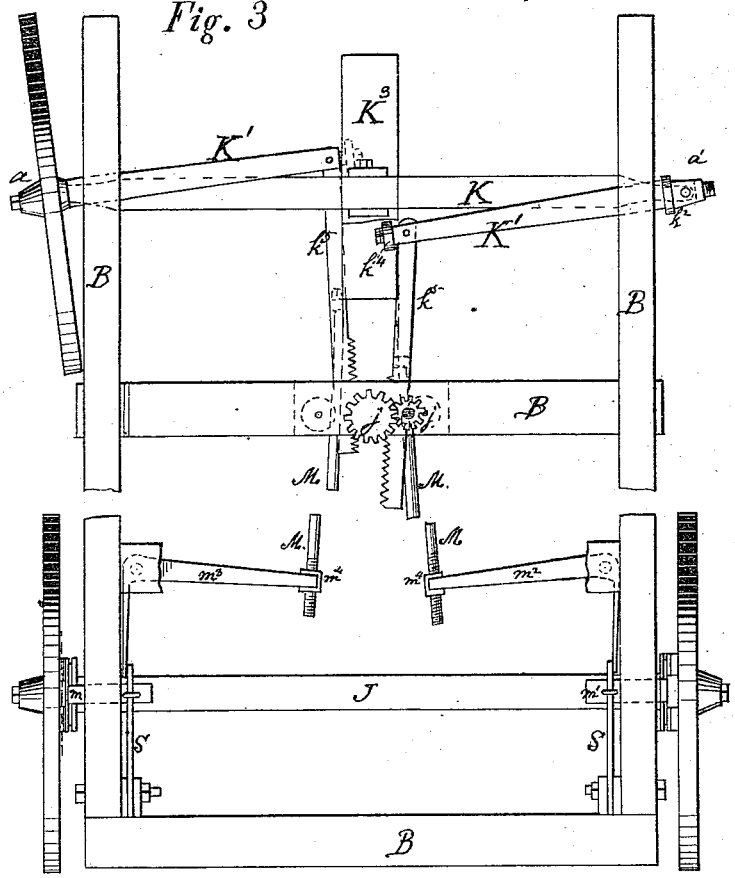
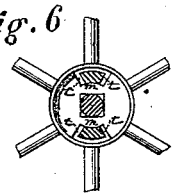
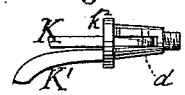
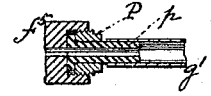
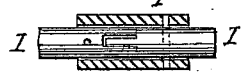
WITNESSES
Grenville Lewis
INVENTOR
George T. Ellis
By
Hine & Ellsworth
ATTORNEYS.
THE GRAPHIC CO.PHOTO-LITH.39 & 41 PARK PLACE,N.Y.

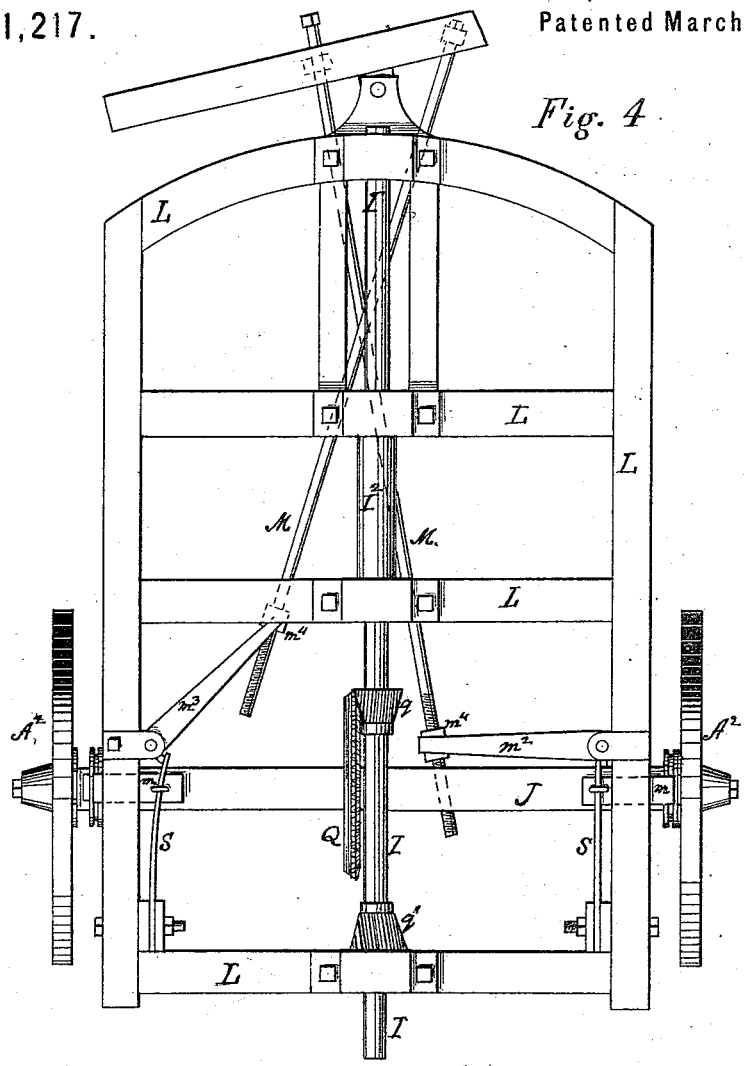
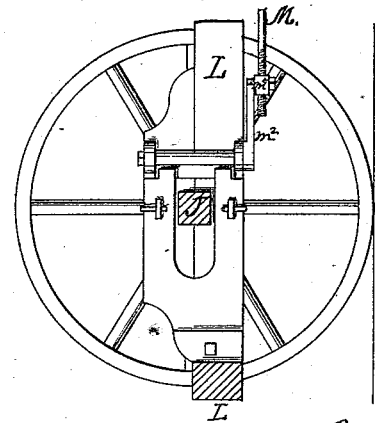

UNITED STATES PATENT OFFICE.

GEORGE T. ELLIS, OF OSWAYO, PENNSYLVANIA, ASSIGNOR OF ONE-HALF HIS RIGHT TO H. LORD, OF SAME PLACE.

IMPROVEMENT IN ROAD-ENGINES.

Specification forming part of Letters Patent No. 161,217, dated March 23, 1875; application filed January 23, 1875.

*To all whom it may concern:*

Be it known that I, GEORGE T. ELLIS, of Oswayo, in the county of Potter and State of Pennsylvania, have invented certain new and useful Improvements in Land - Conveyance; and I do hereby declare the following to be a full and exact description of the same, reference being had to the accompanying drawings, forming part of this specification, in which—

Figure 1:
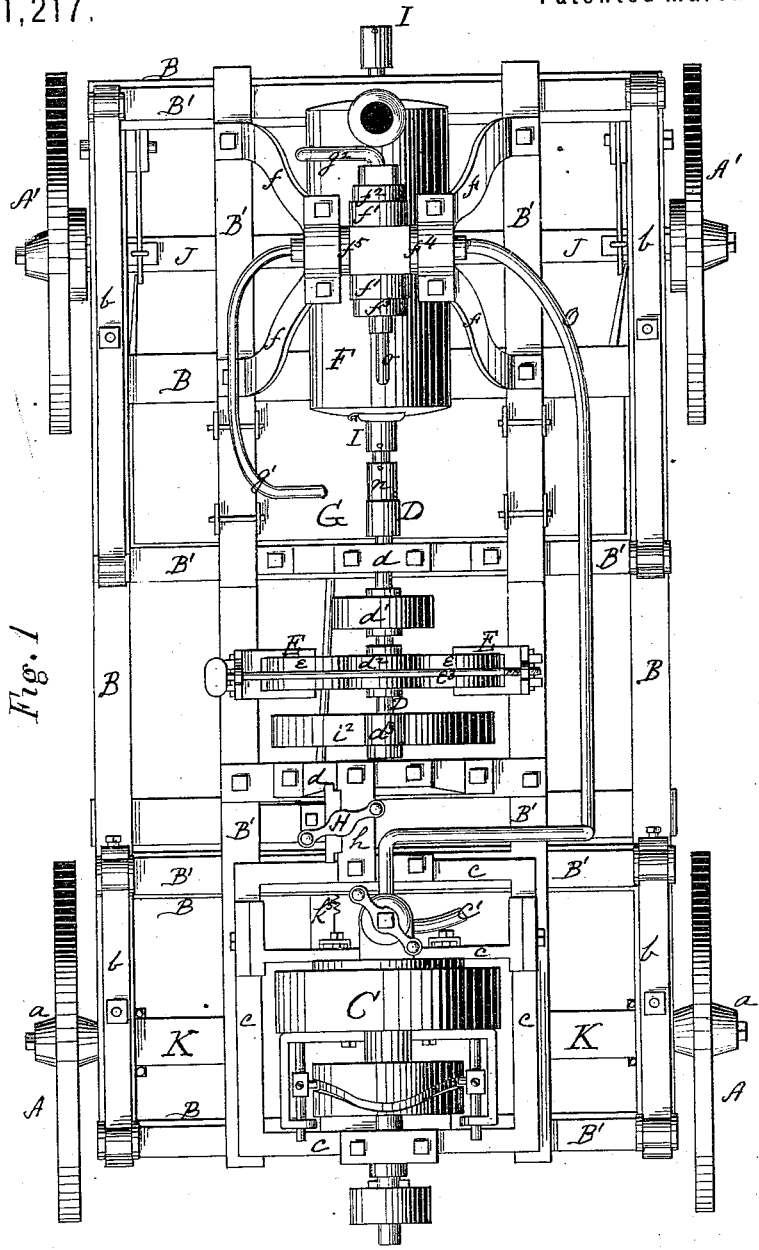
Figure 2:
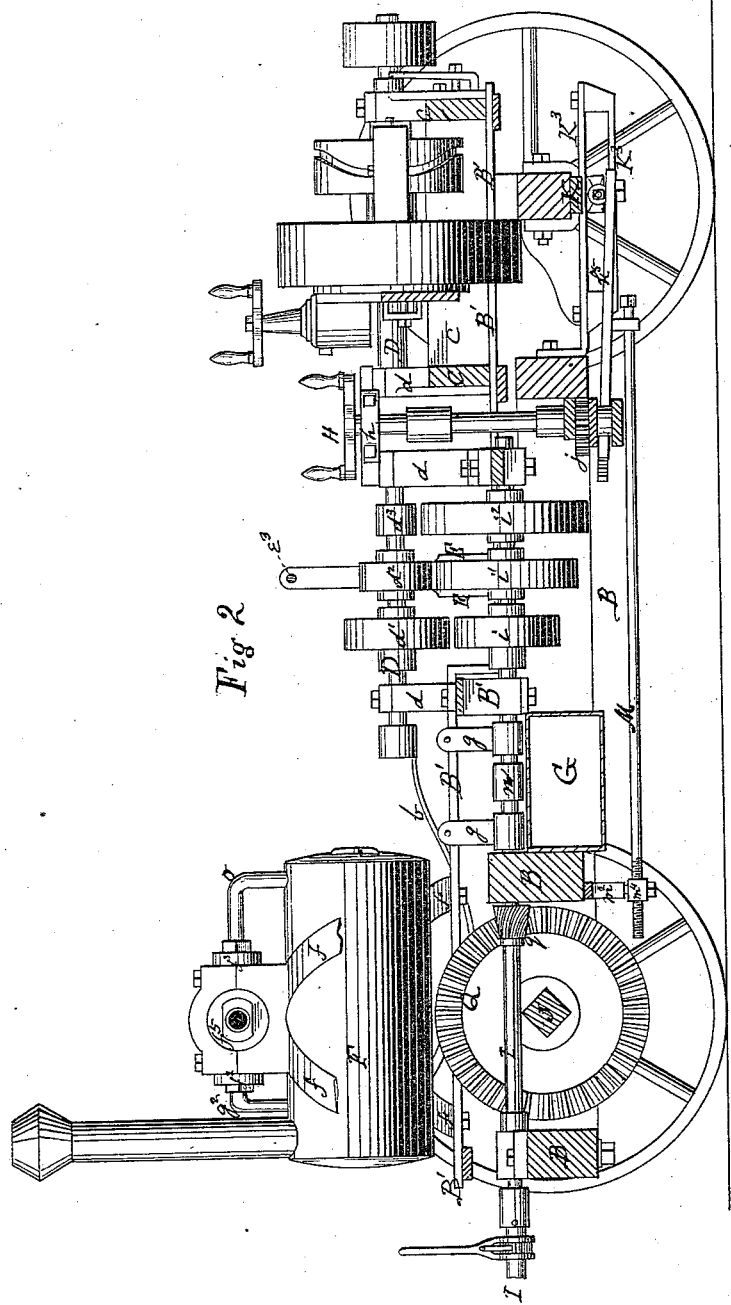

Figure 1 is a top-plan view; Fig. 2, a longitudinal vertical section of the locomotive; Fig. 3, a bottom-plan view, showing parts of the same. Fig. 4 is a top-plan view of the road-wagon adapted to be used with said locomotive. Fig. 5 is a partial section of the same; Fig. 6, a section of the driving-wheel, taken in line $x\,x$ of Fig. 3; Fig. 7, a side view of the end of the pilot-wheel axle; Fig. 8, a section of the cross-head trunnion, plug, tube, and pipe; and Fig. 9, a section showing one mode of constructing the shaft-couplings.

Similar letters of reference in the accompanying drawings denote the same parts.

This invention pertains to that department of land-conveyance in which steam is employed as the motive power for driving carriages adapted to common roads; and the object of the invention is to improve such carriages—first, so that they can be turned, guided, and handled more quickly and easily; secondly, so that the power can be increased at will on ascending and descending grades, or when a greater weight is carried, and decreased under the reverse conditions; thirdly, so as to avoid the necessity of heavy traction-engines; fourthly, so as to secure complete and instant adjustability of the boiler and furnace to any inclination of the road-bed; fifthly, so as to dispense with the necessity for brakes, and yet control the movement of the wheels with increased power, efficiency, and certainty; and, sixthly, so as to secure increased economy in the running expenses of the system of land-conveyance referred to. To these several ends the invention consists, first, in a novel and improved mode of changing the direction of the steering or pilot wheels of the traction-engine; secondly, in the application of the driving-power directly to each wheel throughout the train, so that every wheel becomes a driving-wheel when the carriages are in operation, and so as to dispense with all brakes; thirdly, in constructing said driving-wheels so that they will have a limited play or independent movement on their respective axles to facilitate the turning of slight curves; fourthly, in constructing said driving-wheels so that, when turning a sharp curve, one of the wheels on each axle will, while passing the curve, automatically become independent of its axle and rotate freely thereon; fifthly, in constructing said driving-wheels so that the outer wheel on the curve will continue directly connected to the driving-power, while the inner one is temporarily disconnected therefrom, as above referred to; sixthly, in adapting the locomotive to the employment of the rotary form of steam-engine, and combining such engine therewith in such a manner that the steam-power is applied directly to a shaft extending the whole length of the carriage or train, and connected directly with the driving-wheels on the several carriages; seventhly, in combining the shaft driven directly by the engine with a shaft to drive the carriage-wheels, and means for increasing the power and decreasing the velocity, or decreasing the power and increasing the velocity, at which the former shall drive the latter, at the will of the engineer; eighthly, in suspending the boiler and furnace from a support, on which they shall be free to swing, so as to maintain their horizontal position whatever may be the inclination of the road-bed or ground on which the carriage is standing or moving; and, ninthly, in the various combinations and details of construction, as hereinafter specified and claimed, by which the several principles of operation above referred to are economically and successfully carried into practical operation.

In the drawings, A A represent the pilot-wheels, and $A^1\,A^1$ the rear wheels, of the locomotive; and $A^2\,A^2$ represent one pair of the wheels of the next carriage to the locomotive. B is the main frame of the locomotive, and B' is a secondary frame hung upon springs $b\,b\,b\,b$, for the purpose of carrying the supports $c\,c$ of the rotary engine $d\,d$ of the engine-shaft E E of the device for varying the power and velocity of the driving-shaft $ff$ of the furnace and boiler, $g g$ of the water-tank, and $h h$ of the steering-wheel H. I I are segments of the driving-shaft, arranged longitudinally of each carriage, and adapted to couple automatically when the carriages are brought together. J J are the axles of all the wheels except the pilot-wheels. K $K^1$ are the axles of the pilot-wheels. L is the main frame of a road-wagon, adapted to be drawn by the locomotive, it being provided with only one pair of wheels, and its front end being supported by the rear end of the locomotive; and M M are rods, by the draft of which one or the other of the wheels $A^1 A^1$ or $A^2 A^2$ can be disengaged, so as to rotate freely on its axle when passing a sharp curve.

The axle of the pilot-wheels is constructed in three parts—one, K, rigid, and extending across under the rocking bolster of the main frame B, with its ends projecting beyond the sides of said main frame into the hubs $a a$ of the pilot-wheels, and two others, $K^1 K^1$, connected at their inner ends to the steering-wheel H by means of rods or bars $k k$, and near their outer ends, within the wheel-hubs $a a$, pivoted to the ends of the fixed part K, so as to project beyond said part. The pilot-wheels are hung upon the swinging parts $K^1 K^1$, and change direction as those parts are swung on their pivots by the operation of the steering-wheel. I prefer to divide the skein or outer end of the parts $K^1 K^1$, as shown in Fig. 7, and make the ends of the rigid part $K^1$ project into the space between the two branches of the skein—a construction which affords a better bearing for the wheels and greater strength in the axle. In that case the collar $k^2$ may be placed around the two branches of the skein at the inner end of the hubs $a$, to further support them. In all cases the pivots $a'$, upon which the pilot-wheels change direction, should come in the line of draft of each wheel, so that the resistance of the wheels, when they strike against obstacles, will be divided equally on both sides of the pivot, causing the wheels to run steadily, and preventing any violent and dangerous movement of the arms $K^1 K^1$ and the steering apparatus. The proximate ends of the arms $K^1 K^1$ work between two guide-plates, $K^3$, and may be provided with friction-rollers $K^4$.

The power that drives the locomotive is applied to the rear wheels $A^1 A^1$, either by the engine-shaft D or the supplementary shaft I. When the latter is employed, as represented in the drawings, a series of pulleys or friction-wheels, $d^1 d^2 d^3$, of different sizes are arranged on the engine-shaft, and a series of similar pulleys or friction-wheels, $i i^1 i^2$, on the driving-shaft I, the large wheels on one shaft corresponding in position to the small ones on the other. The wheels $d^1 d^2 d^3$ are not in actual contact with the wheels $i i^1 i^2$; but any corresponding pair, $d^1 i, d^2 i^1$, or $d^3 i^2$, may be brought into connection by means of intermediate friction-wheels $e e^1 e^2$. The intermediate wheels $e e^1 e^2$ are supported in suitable movable bearings or standards of any preferred construction, and may be applied to their respective working pulleys by any kind of mechanical power that can be conveniently employed on the carriage. The drawings represent them as constructed to be clamped against the working pulleys by means of connecting screw-rods $e^3$; but connecting-levers, or any other device that will hold the intermediate wheels against their respective pulleys, will be an equivalent.

It will be observed that the engine, boiler, furnace, engine-shaft, and front part of the driving-shaft are all supported by the spring-frame $B'$, while the rear portion of the driving-shaft, under the boiler and furnace, is supported by the rigid main frame of the carriage. The two parts of said shaft I must, therefore, be connected by a flexible coupling, which is provided at $n$. Any other part of the machine which is connected both to the movable and the fixed frames, or other parts not always occupying the same relative position—as, for example, the vertical shaft of the steering-wheel H and the projecting ends of the sections of the shaft I of different cars—may be made in sections, joined by flexible couplings suitable for the purpose.

The boiler and furnace F are suspended by straps $f^1$ from a stout cross-head, $f^2 f^3 f^4 f^5$, supported in suitable bearings in standards $f$. The straps, passing around the longitudinal arms of the cross-head, allow the boiler and furnace to swing laterally to adjust themselves to a horizontal position, and the cross-head, rocking freely upon its lateral arms or trunnions $f^4 f^5$, allows said boiler and furnace to swing longitudinally of the carriage, to adjust themselves to a horizontal position. Whatever may be the inclination of the road or the ground, therefore, (within practicable limits,) the boiler and furnace automatically maintain their proper level.

The steam connection between the engine and boiler is effected by means of the pipe O, which communicates with the steam-chest of the boiler through a suitable passage in one of the trunnions, $f^4$, of the cross-head, and a pipe, $o$, extending from one of the ends of the cross-head to the boiler. The feed-water pipe $g^1$, extending from the tank G, communicates with the boiler in a similar manner through the opposite trunnion, $f^5$, and pipe $g^2$.

To obviate any difficulty in forming a tight connection between the rigid pipes O $g^1$ and the oscillating trunnions of the cross-head, and to keep the joints at all times perfectly tight, notwithstanding their wear, I screw into the trunnion a stout tubular plug or block, P, as shown in Fig. 8. Through this tube extends a smaller tube, $p$, having a flange around its inner end, which the steam presses tightly against the inner end of the large tube or plug, so as to make not only a tight joint, but a joint which becomes tighter the longer it wears and the greater the steam-pressure. The outside pipes O $g^1$ o $g^2$ are connected by rigid elbows to the small tubes $p\ p$, and the latter remain fixed, while the surrounding tubular block P and the trunnion into which it is screwed oscillate together in their bearing.

The carriages to be drawn by this locomotive may be provided with four wheels, or more, if for use on railways; but if for common roads, two wheels will answer the purpose, the front end of the carriage being supported by a short reach and king-bolt or other suitable coupling, connecting it to the rear end of the locomotive. The other carriages of the train may be connected together in a similar manner, and I propose to make use of any known form of coupling for the purpose.

When the several carriages are coupled the sections I I$^1$ of the driving-shaft are also coupled together, either automatically or otherwise. The couplings of the shaft should be flexible to accommodate the movements of the carriages, and should also allow the sections of the shaft a limited longitudinal sliding movement, but should lock the several sections of the shaft together securely, so that all will rotate together in either direction. Such sliding flexible shaft-couplings are well known in the arts; and I intend to employ any known device for the purpose that will accomplish the object.

The power is applied from the longitudinal shaft I I$^1$, &c., to the carriage-wheels A$^2$ A$^2$ by means of a large crown-wheel, Q, fixed upon the axle J, and bevel-gearing $q\ q'$, arranged upon and rotating with the driving-shaft, as shown in Figs. 2 and 4.

As the driving-shaft must extend beyond the axle to afford power to the other carriages of the train, it is obvious that it cannot pass in line with the axis of the crown-wheel, but must extend above or below the axle. This would throw a straight toothed gear out of working relation to the crown-wheel, and accordingly I employ gears with inclined or twisted teeth, which, although working on a center out of line with the center of the crown-wheel, mesh perfectly with the cogs of the latter. The size of the crown-wheel has a certain relation to the size of the draft-wheels A$^2$ A$^2$, it being my design that the power applied to the rim of the crown-wheel shall be applied not only in front of the axle, but at such a distance therefrom that its leverage upon the axle will exceed the opposite leverage of any ordinary stone or other obstacle over which the wheels are liable to run—that is, that a vertical plane transverse to the shaft I through the pitch-line of the gears at the point of contact shall extend forward of a similar plane through the point of contact between the wheel and the obstacle. The gear $q$ will, in that case, lift upon the wheels at greater advantage than the obstacle will have in resisting the movement of the wheels.

The carriage is designed to be driven always by the gear, $q$ or $q'$, that happens to be forward of the axle at the time, and the other gear is, meanwhile, thrown out of operation. This is accomplished by means of an ordinary sliding shaft-coupling, I$^2$, consisting of a sleeve and spline or pin, and by arranging the two gears so far apart that, when the section of shaft to which they are attached is slid backward as far as it will go, the forward gear will engage with the crown-wheel, and when slid forward the other gear will engage with the crown-wheel.

If it be desired on any occasion to disconnect the wheels of any car or carriage from the driving-power, so that such car or carriage shall be drawn by the one in front of it, and shall not propel itself, then the two gears $q\ q'$ of such carriage should be at such distance apart that, when their shaft-section is slid forward or back half as far as it can go, neither gear will engage with the crown-wheel.

My reason for driving the wheels A$^2$ A$^2$ by the front gear is, because in that case the gear has a tendency to ride up on the crown-wheel, and, in fact, does cause a considerable portion of the weight of the carriage and its contents to be thrown on said crown-wheel and on the middle of the axle, thereby, to that extent, relieving the bearings of the axles, and causing the weight of the freight and carriage to assist in propelling the carriage along. If the power were applied by the other gear, the opposite effect would be produced, and the friction between the axle and its bearings would be increased.

A collar or collars are fixed upon that part of the shaft I I$^1$, which projects in front or in rear of the carriage, and a lever or levers, or other mechanical equivalent, are attached thereto or connected therewith, by which the shaft can be slid forward or backward, to throw the gears out or bring them into connection, as above stated, and a ratchet-lever may also be connected to the shaft at that place, or provision may be made by which such a ratchet-lever may be applied at any time to turn the shaft around and move the carriage backward or forward without the aid of the locomotive, for the purpose of making up trains, &c.

As the wheels are all driving-wheels, they must ordinarily be fixed rigidly to their axles; but in turning corners and sharp curves it is also desirable that one of each pair should rotate independently of its axle. With the exception of the pilot-wheels of the locomotive, I therefore construct and apply all the wheels in such a manner that the two that operate on each axle both take part in rotating their axles when running on straight lines; but when running on curves or turning a corner the inner wheel moves independently of its axle, which is turned meanwhile by the outer wheel alone.

The devices by which this is accomplished are as follows: Both wheels are mounted loosely on their axle, and, ordinarily, are caused to rotate therewith by sliding clutches $m$ $m^1$, held engaged with notches or recesses in the hubs of the wheels by the action of stout springs S S'. Near each end of the axle a strong elbow-lever, $m^2$ $m^3$, is pivoted to the carriage frame or truck, or to a suitable clip mounted thereon, and is connected to the nearest sliding clutch, so that by operating the lever the clutch can be drawn back, and the wheel disengaged and allowed to run loosely on the axle. The inner ends of the elbow-levers are provided with swiveled blocks $m^4$, to which are attached the long crossed rods M, extending forward to the next carriage, and fastened securely thereto. The effect of this arrangement is, that when the train is turning a curve or corner, the rod M, whose forward end is attached to the front carriage on the outer side of the curve, will draw upon the elbow-lever connected to the other end of the rod, and thereby retract the sliding clutch and disengage the wheel, which will be, of course, the wheel on the inner side of the curve. The other wheel will continue to be driven by the shaft I I$^1$ and to drive the carriage. The power is therefore constantly applied in moving the carriage forward or back, and yet the wheels are effectually prevented from sliding while running on curves.

In turning a slight curve it is not necessary to bring the rods M M into play, and, therefore, the clutch-teeth may be made with a slight play in the recesses in which they engage, as shown at $t$ $t'$, Fig. 6. This will enable the wheels to have a limited play on their axles, and yet will not interfere with their applying the power properly thereto.

The rods M M may be adjusted by screwing through the nuts or blocks $m^4$, or by screw-nuts, or in any other suitable and practicable manner.

On the locomotive it is evident that the rods M M cannot be carried to another car in front, and the construction above described is there so far modified as to cause said rods to be operated by the steering-wheel, as shown in Fig. 3. The power of the steering-wheel may be increased, as desired, by means of pinions $j$ $j$, or their equivalent. The engine-exhaust is represented at $e^1$, and it may be connected by a suitable pipe with the furnace or smoke-flue, for the purpose of using the exhaust-steam to increase the draft, clear the flues, &c., in the usual manner. The locomotive may be constructed to operate as a "double-ender," but ordinarily it will not; and therefore that part of the shaft I which is supported on its main frame is not made to slide endwise, and but a single small gear is used upon it to run the crown-wheel of the driving-axle. It may be constructed like the other cars in that respect, when intended for a double-ender. It is obvious that, instead of sliding the shaft I to apply the bevel-gears to the crown-wheel, said gears may be arranged on a sleeve which slides on the shaft, and is connected thereto by a spline, the effect of which would be the same.

I do not limit my invention to the mechanical details herein shown and described, but may use any equivalent of the sliding clutches, elbow-levers, steering-wheel, and other parts, where there are well-known equivalents thereof.

Having thus explained the construction and operation of my improved locomotive and cars, it will be obvious that the principles herein set forth may be applied for ordinary road purposes, to railways, to carriages for towing canal-boats, or, generally, to any kind of draft, freight, or passenger carriage. The new principle, herein first practically applied to trains, of not depending upon the locomotive for traction, but providing each car with driving-wheels of its own, by which it propels itself and assists to propel the other carriages, obviously enables me to construct the locomotives exceedingly light, with all the attendant and consequent advantages thereof. The ease and quickness with which the train can be handled, and the perfect certainty with which it automatically prepares itself for passing curves in the road, are of scarcely less value in carriages for the purposes herein referred to. The mode of driving the carriage is admirably adapted to the use of the rotary engine—the lightest and best form of engine for the purpose—although any other form of engine may be substituted, if preferred.

I claim as my invention—

1. The combination of the pilot-wheels, the rigid part of the axle, and the movable parts of the axle, pivoted to such rigid part, and having the wheels attached to their outer ends, while to their inner ends power may be applied from the steering-wheel, substantially as set forth.

2. The combination of the pilot-wheel, the rigid part of the axle, and the movable part of the axle, pivoted to the rigid part in the line of draft of the wheel, substantially as and for the purposes set forth.

3. The combination of the movable parts of the pilot-wheel axles with the guide-plate K$^3$, bars K$^5$, and steering-wheel H, substantially as and for the purposes set forth.

4. The combination, in a locomotive-carriage, of driving-wheels and axle with a longitudinal driving-shaft and a rotary engine, having its axis longitudinally of the carriage, so that the power can be applied to the driving-wheels directly from the engine-shaft, or from a shaft connected to the engine-shaft by straight gearing, substantially as set forth.

5. The combination of the engine-shaft with the parallel driving-shaft I I$^1$ and the friction-wheel gearing, for communicating motion from one shaft to the other, substantially as set forth.

6. The set of pulleys of different sizes on the engine-shaft, combined with the set of similar pulleys on the driving-shaft, and the set of adjustable intermediate friction-wheels, by which the power or speed of the driving-shaft can be varied at will without varying the power or speed of the engine-shaft, substantially as set forth.

7. The combination of driving-wheels and axle with a driving-shaft passing above or below the axle, and communicating power by means of a crown-wheel and beveled oblique-toothed gearing, for the purpose of driving the carriage, substantially as described.

8. The combination of the carriage-frame, the driving-wheels and axle, the longitudinal driving-shaft, operated directly from the steam-engine, and the crown-wheel and bevel-gear, to apply the power at the front edge of the crown-wheel, for the purpose of lifting the carriage-frame on its bearings on the axle while the carriage is running, and by the power applied to drive the same, substantially as set forth.

9. The combination of the driving-wheels and axle, the longitudinal driving-shaft, and the two bevel-gears, the driving-shaft being capable of sliding endwise, so as to apply the power to the front edge of the crown-wheel, whichever way the carriage may be moving, substantially as set forth.

10. The combination of driving-wheels, driving-shaft, and sliding-clutch connection, by which the wheels can be made to run with the shaft backward or forward, or independently on it, substantially as set forth.

11. Driving-wheels combined with their axles, actuating mechanism, and attaching or detaching devices, constructed to permit the wheels to rotate with the axle, or to be liberated and rotate freely thereon while the vehicle is in motion, all substantially as set forth.

12. In a locomotive or other carriage having a driving-axle and driving-wheels connected by a sliding clutch, the rods M M, combined with the elbow-levers, substantially as and for the purpose set forth.

13. The combination of two or more carriages with the crossed rods M M, connected to the sliding clutches that lock the driving-wheels to their shaft, for the purpose of enabling the movement of the carriages themselves to unlock and liberate the wheel on the inner side of the curve, substantially as set forth.

14. The combination of the divided and pivoted pilot-wheel axle and the steering apparatus with the rods M M and the driving-wheels, axle, and clutches, by which the same movement of the steering-wheel that changes the course of the pilot-wheels also unlocks and liberates the driving-wheel on the inner side of the curve, substantially as set forth.

15. The combination of two or more carriages with a single longitudinal driving-shaft common to all the carriages, for the purpose of driving the same, substantially as described.

16. In a locomotive, a boiler and furnace combined with and suspended by a gimbal or universal joint, so as to swing automatically to a horizontal position in any direction, substantially as set forth.

17. The oscillating cross-head $f^2$ $f^3$ $f^4$ $f^5$, combined with the boiler and furnace, and with the feed-water and steam pipes, substantially as and for the purpose set forth.

18. The plug or block P, combined with the tube $p$, the oscillating cross-head, and the steam or water pipes, substantially as and for the purpose set forth.

GEORGE T. ELLIS.

Witnesses:
M. CHURCH,
THEODORE MUNGEN.